Feb. 16, 1926.

H. J. VENNES

ELECTRICAL BRIDGE

Filed July 20, 1920

Inventor:
Harald J. Vennes.
by C.C. Sprague, Att'y.

Patented Feb. 16, 1926.

1,573,337

UNITED STATES PATENT OFFICE.

HARALD J. VENNES, OF NEW YORK, N. Y., ASSIGNOR TO WESTERN ELECTRIC COMPANY, INCORPORATED, OF NEW YORK, N. Y., A CORPORATION OF NEW YORK.

ELECTRICAL BRIDGE.

Application filed July 20, 1920. Serial No. 397,769.

*To all whom it may concern:*

Be it known that I, HARALD J. VENNES, a citizen of the United States, residing at New York, in the county of Bronx, State of New York, have invented certain new and useful Improvements in Electrical Bridges, of which the following is a full, clear, concise, and exact description.

This invention relates to bridges or balanced networks of a type particularly adapted for alternating current measurements.

An object of the invention is to provide a bridge of a very simple type for measuring the impedances of devices such as condensers, coils, or lines.

The invention in the form herein described comprises a single coil or transformer having a plurality of windings, which when properly associated with a suitable source of current, a suitable detector, and a proper standard of impedance serves for the measurement of unknown impedances. The windings on the transformer are arranged similarly to those used on what are known as hybrid coils which are extensively used in the art of signaling for duplex repeating from one circuit to another.

From another aspect the invention comprises a bridge which consists entirely of a plurality of paths each including windings, all of which are inductively related, as for example by winding them on a common core. There are four paths in the balanced circuit of the bridge, each having an individual winding. All these windings are connected electromagnetically to two other coils which may be designated "primary coils."

A bridge of this type is convenient and simple and consists of less apparatus than those of the ordinary type. For these reasons it is much more easily shielded and assembled and less subject to electrostatic unbalance or other disturbances caused by external influences.

Figure 1:
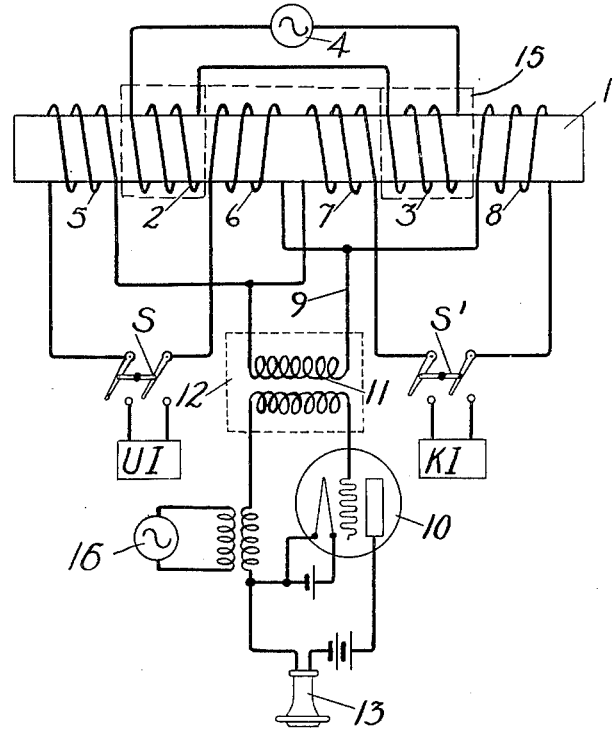
Figure 2:
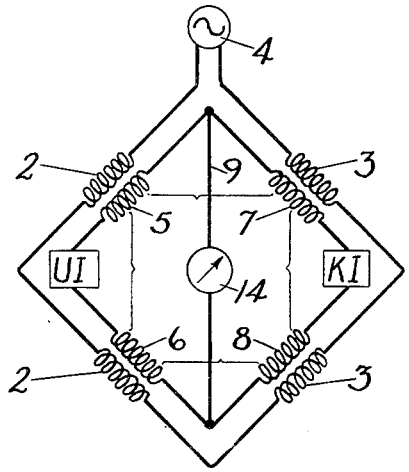

In further describing the invention, reference will be had to the accompanying drawing wherein Fig. 1 is a circuit diagram of the essential features of a complete measuring system including the bridge; and Fig. 2 is a diagram more clearly illustrating the bridge-like nature of the circuit.

In a preferred form of the bridge a suitable magnetic core 1 is wound with primary windings 2 and 3 which are connected in series with any suitable source 4 of variable current. Ordinarily the core 1 will be of toroidal form to reduce magnetic leakage. Secondary windings 5, 6, 7 and 8 are also wound on the core 1. An output circuit 9 is so connected to the secondary windings that a closed path from one side of the circuit 9 can be completed through coils 5 and 6 and another closed path through coils 7 and 8, each path returning to the other side or terminal of the circuit 9. The first path includes a switch S for switching into the circuit any unknown impedance UI which is to be measured. A switch S' is likewise provided for connecting in any suitable variable standard of impedance KI with which the unknown impedance is to be compared. The windings 5, 6, 7 and 8 which may be designated "secondary windings" should be accurately balanced, both for inductance coupling and distributed capacity so that a voltage impressed from source 4 causes no current in circuit 9 when the impedances UI and KI are equal. If desired, however, the coils may be so designed that the condition of no current in circuit 9 corresponds to some other definite relation of the values of impedances UI and KI. The simplest and preferred relation is that of equality. For the highest degree of accuracy the secondary windings should be electrostatically shielded from the primary so that any capacity unbalanced in the primary circuit will not cause an unbalance in the secondary circuit. The method of shielding windings is known and needs no detailed description, but is conventionally indicated by the dotted lines 15. The output circuit 9 may be connected to any suitable indicating or detecting device. In case the frequencies at which measurements are to be made are audible an indicator alone may be used, but where the frequencies are inaudible a detecting device will be necessary. For undamped inaudible frequency waves some beat frequency source 16 is provided to give an audible beat note. The detecting device may conveniently assume the form of a thermionic detector 10, whose input circuit includes the secondary of the transformer 11 which is shielded by a suitable shield of lead foil 12 or other conductive shielding material. The source 16 is connected to the input circuit by a transformer. The output circuit of the device 10 is connected to a telephone receiver 13.

*Operation.*—The method of operation is very simple. The source 4 is connected to the primary windings, the unknown impedance is connected by the switch $s$, and the known impedance is connected by the switch $s^1$. Source 16 is adjusted, if necessary to produce an audible beat note or tone in receiver 13. The known impedance is thereupon varied until no sound is heard in the receiver 13. By reading off from a scale attached to the known impedance the value at which this occurs the impedance of the unknown element or combination for the particular frequency being used is at once known or readily computed.

Fig. 2 is a diagram to show clearly how the system constitutes a bridge. Each of the windings 2 and 3 are shown in two places in Fig. 2 for the purpose of illustrating the fact that they are each coupled so as to impress an electromotive force upon the circuit including the coils 5, 6, 7 and 8 in a plurality of places. This is merely a convenient diagram and does not indicate that there is more than one coil 2 and one coil 3. The braces indicate the coupling which exists between all the coils taken in pairs. Branch 9 is shown as including indicating means 14 of any suitable kind.

Since hybrid coils are commonly used in telephone work, and are almost always available it is often very convenient to utilize such a coil in a circuit of this kind as a bridge when more complicated bridges are not available.

The novel features believed to be inherent in the invention are defined in the appended claims.

What is claimed is:

1. A measuring bridge comprising a transformer having a plurality of windings, a source of waves connected to certain windings of said transformer, other windings of said transformer being included in a circuit with a known and an unknown impedance, a path connecting separate points of said circuit and including a translating element, and means for shielding said element.

2. A bridge for measuring the impedance of a device for alternating current comprising four impedance elements upon each of which voltage of the frequency of the alternating current at which measurements are to be taken is impressed, an input circuit coupled to all of said elements for directly impressing the voltage thereon, variable known impedance means in series with two of said elements, and an impedance to be measured in series with the other two of said elements.

3. A measuring bridge comprising two primary windings and four secondary windings, each winding being electromagnetically coupled to each of the other windings, and a conductive electrostatic shield separating the primary windings from the secondary windings.

4. A measuring bridge comprising four windings each connected electromagnetically to the other three, a variable known impedance connected between two of the windings, an input circuit coupled to all of the windings, and an output circuit connected to said windings, said output circuit comprising a transformer whose primary and secondary are inductively shielded from each other.

5. A measuring bridge comprising four windings each connected electromagnetically to the other three, a variable known impedance connected between two of said windings, an input circuit coupled to all of said windings, and an output circuit connected to said windings including a shielded transformer.

6. The method of measuring the value of an unknown impedance by means of a variable known impedance and a coil having four pairs of terminals, two of which are conjugately related, comprising connecting a known impedance to one of said conjugate pairs and the unknown impedance to the other of said conjugate pairs, impressing an electromotive force upon the third of said pairs, and varying said known impedance until the difference of potential measured across the fourth of said pairs is a minimum.

In witness whereof, I hereunto subscribe my name this 15th day of July A. D., 1920.

HARALD J. VENNES.